United States Patent [19]

Puscasu

[11] Patent Number: 4,638,291
[45] Date of Patent: Jan. 20, 1987

[54] SENSOR ASSEMBLY FOR A RADIATOR MOUNTED COOLANT LEVEL MONITORING SYSTEM

[75] Inventor: Boris Puscasu, Dearborn Heights, Mich.

[73] Assignee: Ford Motor Company, Dearborn, Mich.

[21] Appl. No.: 620,298

[22] Filed: Jun. 13, 1984

[51] Int. Cl.[4] .......... B60Q 1/00; G01F 23/00
[52] U.S. Cl. .................................... 340/59; 340/612; 340/620; 324/65 P; 338/28; 200/190; 200/61.04; 73/304 R
[58] Field of Search ............ 340/59, 620, 602, 604, 340/612; 73/304 R, DIG. 5; 324/65 P, 446; 338/27, 28; 200/182, 190, 61.04, 61.05

[56] References Cited

U.S. PATENT DOCUMENTS

| | | | |
|---|---|---|---|
| 824,098 | 6/1906 | Dawes | 340/518 |
| 2,792,566 | 5/1957 | Shanhouse et al. | 340/620 |
| 3,060,374 | 10/1962 | Strain | 324/434 |
| 3,499,130 | 3/1970 | Norred | 200/61.04 |
| 3,689,883 | 9/1972 | Hill | 340/59 |
| 3,694,804 | 9/1972 | Hill | 340/59 |
| 3,845,464 | 10/1974 | Engel | 340/59 |
| 3,942,167 | 3/1976 | McClintock | 340/620 |
| 3,978,463 | 8/1976 | Kerscher, III | 340/59 |
| 4,027,172 | 5/1977 | Hamelink | 307/118 |
| 4,147,596 | 4/1979 | Baboian et al. | 204/1 T |
| 4,277,773 | 7/1981 | Blatnik | 340/59 |
| 4,385,290 | 5/1983 | Fiala | 340/59 |
| 4,467,658 | 8/1984 | Dube et al. | 324/441 |

*Primary Examiner*—Donnie L. Crosland
*Attorney, Agent, or Firm*—Paul K. Godwin, Jr.; Clifford L. Sadler

[57] ABSTRACT

An electrically conductive liquid level sensor utilizing a pair of parallel closely spaced electrically conducting probes that are exposed within a liquid container for immersion in said liquid. The sensor includes an electrical insulator partition extending between the probes so as to interrupt any direct path therebetween while at the same time localizing the conduction path to a narrow band of liquid levels due to the close spacing of the probes.

6 Claims, 5 Drawing Figures

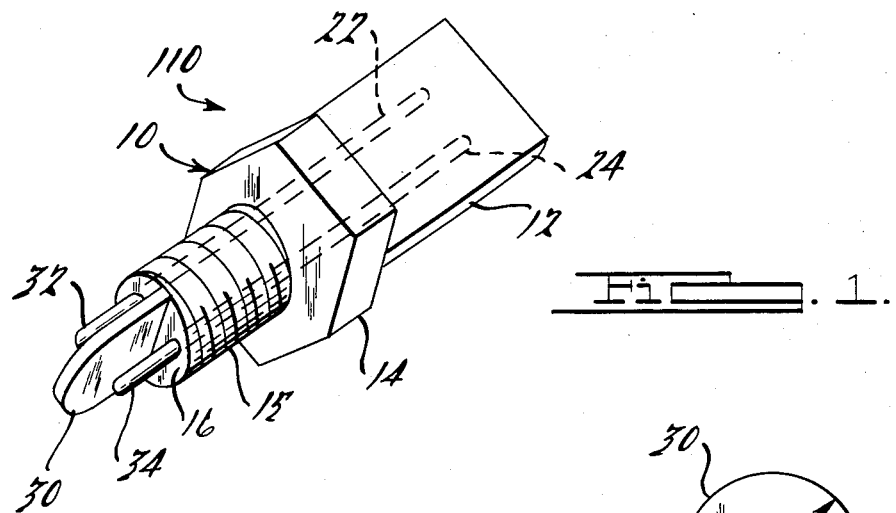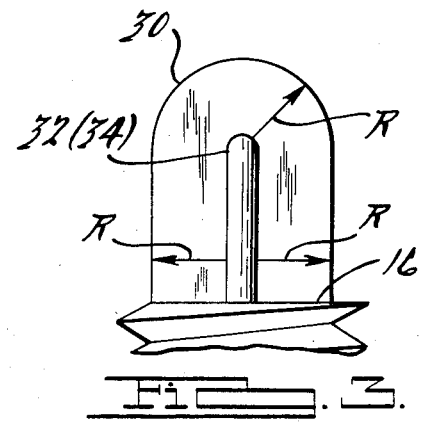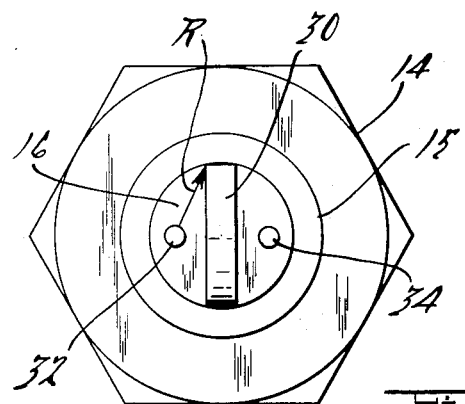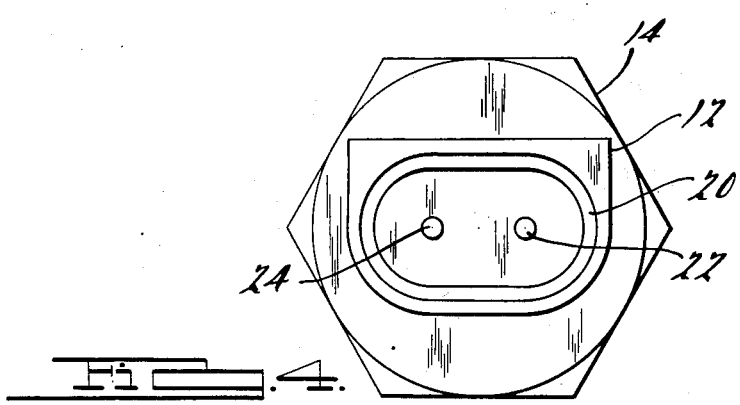

SENSOR ASSEMBLY FOR A RADIATOR MOUNTED COOLANT LEVEL MONITORING SYSTEM

BACKGROUND OF THE INVENTION

1. Field of the Invention

The present invention is directed to the field of liquid level sensing and more particularly to the area of electrically conducting liquid level sensors for use on radiators of liquid cooled engines.

2. Description of the Prior Art

The sensing of the liquid coolant level in a radiator of an associated engine is especially important to the owner of such an engine, since it provides another means for preventing severe damage to the engine. Sensors which measure engine temperature, oil pressure and oil level are well known and, when connected to appropriate warning circuitry, provide essential monitoring features. Monitoring of the level of coolant in a radiator is also important since a reduction of coolant volume will affect the cooling efficiency of the cooling system and in turn affect the operation of the engine. In severe cases where the coolant is lost, due to a leak in the radiator or associated connecting lines, the engine could be severely damaged if a reliable coolant level monitoring system is not in use.

A low coolant sensor is disclosed in U.S. Pat. No. 3,845,464 as mounted within a cavity adjacent to the water passages of an engine. The sensor includes a variable resistance element that is connected to the battery of the associated vehicle and is heated by the electrical current flowing through the element to ground. When the resistance element is in contact with the coolant liquid, it is at a lower temperature due to the cooling effect of the coolant liquid and exhibits a higher resistance state than when it is not in contact with the coolant liquid and reaches a higher temperature. The lowering in resistance, due to a coolant level that is below the sensor, is detected by a simple series circuit in which a lamp is illuminated by the increased current flow.

A liquid level sensor is shown in U.S. Pat. No. 4,277,773 as configured and connected to provide an electrical current through the liquid in contact with its sensor elements to the grounded radiator. Such current flow completes a series circuit by which an indicator lamp is energized whenever the coolant level is high enough to provide a significant current flow between the sensor elements and ground.

It is apparent that in each of the prior art references noted above, the intensity of the warning lamp is dependent upon the amount of current flowing through the sensor to ground and will be effected by sloshing and splashing of the coolant about the sensor.

SUMMARY OF THE INVENTION

The present invention is intended to localize the level sensing point of a conductive liquid by providing a dual probed sensor in which the probes are closely spaced.

It is an object of the present invention to provide a liquid level sensor system which is suitable for use in a radiator of a liquid cooled engine for warning when the coolant level therein is below a predetermined level.

It is another object of the present invention to provide a liquid level sensing probe that has reduced susceptibility to probe damage when mounted through an aperture on the liquid container.

It is a further object of the present invention to provide a liquid level sensor system in which the warning indication of low liquid level is independent of minor or temporary variations in the liquid level.

It is a still further object of the present invention to provide an electrical liquid level sensor that functions independently of the electrical conducting properties of the liquid container to which it is mounted.

BRIEF DESCRIPTION OF THE DRAWINGS

FIG. 1 is an overall perspective view of the preferred embodiment of the liquid level sensor of the present invention.

FIG. 2 is a probe end view of the sensor shown in FIG. 1.

FIG. 3 is a profile view of the probe end of the sensor shown in FIGS. 1 and 2.

FIG. 4 is a view of the electrical terminal end of the sensor shown in FIG. 1.

DETAILED DESCRIPTION OF THE PREFERRED EMBODIMENT

Figure 5:
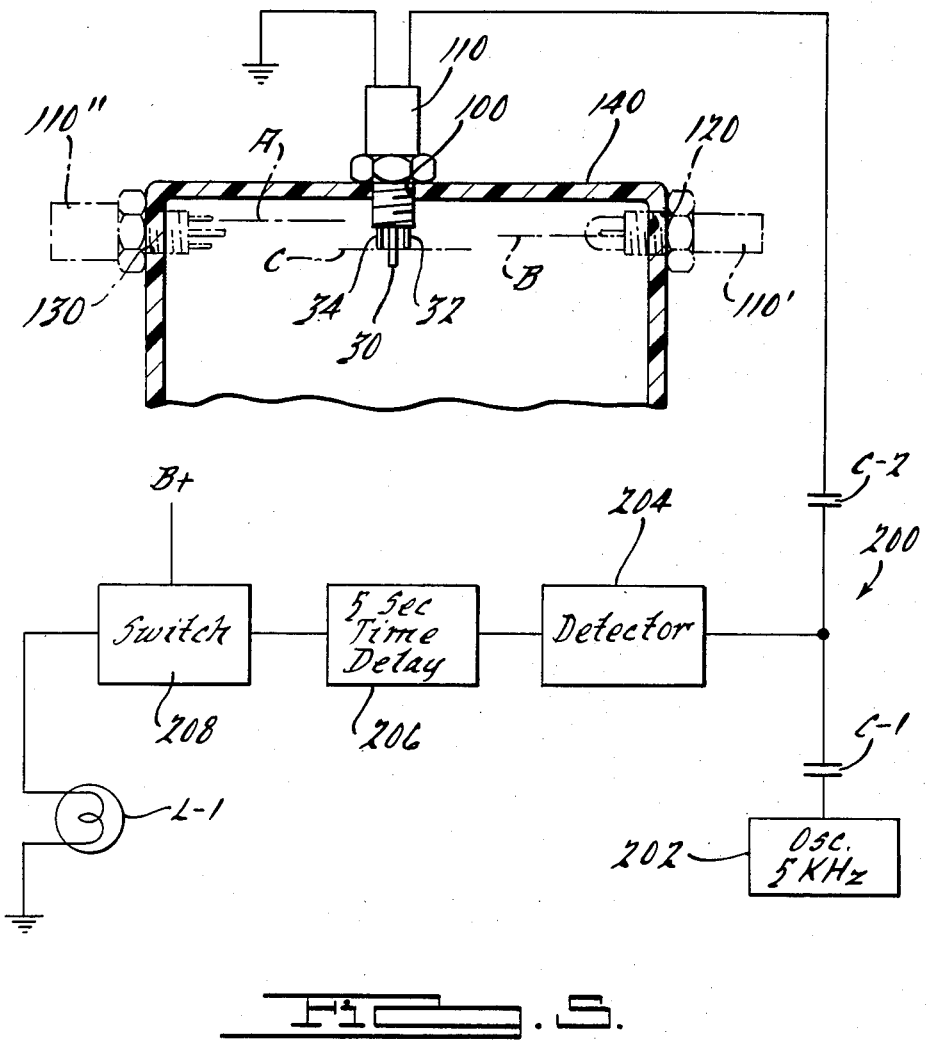
FIG. 5 is a block diagram illustrating the preferred use of the present invention.

FIGS. 1–4 illustrate the various physical features found in the preferred embodiment of the liquid level sensor 110 of the present invention. The body 10 is a unitary structure of electrically insulative material, such as glass reinforced nylon. Portions of the body 10 are designated as terminal shroud 12, hex shaped nut 14, threaded attachment portion 15, and probe face 16. The body 10 is molded about a pair of spaced apart electrical terminals 22 and 24 which are connected to a pair of spaced liquid sensing probes 32 and 34 extending from the probe face 16. The probes 32 and 34 are shown as being of equal length and parallelly extending an equal distance from the probe face 16. The molded body provides a hermetic seal between the probes 32 and 34 on the sensing end and the electrical terminals 22 and 24 within the shroud 12.

An electrical insulator partition 30 extends between the probes 32 and 34 so as to define and extend the minimum electrically conducting path between the probes when they are connected to a source AC electrical potential. The size of the partition 30 is such that it is substantially the same width as the diameter of the threaded portion 15, so as to guide insertion of the sensor into a mounting aperture and prevent damage to the probes during insertion. The dimension "R" between each probe and the outer edge of the partition 30 defines a minimum path distance that is great enough to prevent electrical conduction between the probes when the probes are not immersed within a conductive liquid. The outer edge of the partition 30 is formed so as to constantly maintain, at least, the minimum nonconducting path distance along the length of the parallel probes 32 and 34.

The terminal shroud 12 is formed to define a cavity about the terminals 22 and 24 and preferably contains a mating elastomer 30 to maintain a water-tight seal between a mated electrical plug (not shown) and the terminals 22 and 24 and to prevent corrosion or other contamination.

In FIG. 5, the sensor probe 110, described in FIGS. 1–4, is shown as mounted in a horizontal aperture 100 formed in the top of a liquid container 140. In this embodiment, the liquid container 140 is a radiator for a liquid cooled engine and may be formed of any suitable material, since its electrical conducting properties are not used in the present invention. A sensing and warning circuit 200 is connected to one of the electrical terminals of the sensor 110, while the other terminal is connected to ground. The circuit 200 is used to activate the sensor 110 and includes an oscillator 202 that functions as the AC source by generating a 5 KHZ sinewave signal through a first coupling capacitor C-1. The 5 KHZ signal is coupled to the probe sensor 110 through a second capacitor C-2. If the coolant level is sufficiently high enough (level "C" or above) that it provides a continuous conduction path between the probes 32 and 34 of the sensor 110 around the partition 30, the sensor side of coupling capacitor C-2 is effectively grounded. A detector circuit 204 is connected to the junction between coupling capacitors C-1 and C-2 to monitor the signal present thereon. In the event the liquid level drops below "C", the conduction path between the probes 32 and 34 becomes open and the 5 KHZ signal will appear at the junction. A signal is then generated by the detector 204 to a time delay circuit 206 which, after a five second delay, activates a warning indicator switch 208. The switch 208 connects a B+ supply voltage to an indicator device, such as warning lamp L-1.

In the event of rough turbulence in the liquid causing a momentary interruption of the conduction path between the probes of the sensor 110, the time delay circuit 206 will prevent the inappropriate activation of the warning indicator L-1 unless the conduction path between the probes is continuously interrupted for more than five seconds.

The phantom illustrations of sensors 110' and 110" are shown as alternate installations to the radiator 140. The sensors 110' and 110" are shown as mounted so that the probes extend horizontally. They illustrate a range of levels around which the localized sensing of the liquid level may be determined. In the case of sensor 110', the horizontal probes are shown as lying in a common horizontal plane so that both probes are contacted or immersed in the liquid at the level "B". On the other hand, the sensor 110" is shown having its horizontal probes lying in a common vertical plane. In that installation, the upper probe of sensor 110" is critical in establishing the sensing level "A" of the liquid in the radiator 140.

In any of the orientations, the partition 30 serves to define the minimum conduction path length between the probes and also provides physical protection to the probes upon insertion through the mounting aperture.

It will be apparent that many modifications and variations may be implemented without departing from the scope of the novel concept of this invention. Therefore, it is intended by the appended claims to cover all such modifications and variations which fall within the true spirit and scope of the invention.

What is claimed is:

1. An electrically conductive liquid level sensor comprising, a pair of identical and parallelly spaced electrically conducting probes of equal length exposed along their lengths for contact by said liquid, an electrical insulator partition extending between and beyond the length of said probes so as to interrupt any direct conduction path therebetween, said probes are configured for connection to a source of electrical potential, whereby an electrically conductive path is established between said probes around said insulator partition only when said probes are immersed in said conductive liquid.

2. A sensor as in claim 1, wherein said sensor also includes a pair of electrical terminals connected to said pair of probes and an insulative body for supporting said probes, said terminals and said partition and for providing a hermetic seal between said probes and said terminals.

3. A sensor as in claim 2, wherein said partition is of such a size as to define a minimum electrically conductive path distance between said probes that is constant over the length of said probes, whereby said minimum path distance is defined as being great enough to prevent electrical conduction between said probes when said probes are not immersed in said conductive liquid.

4. In a conductive liquid level monitoring system of a radiator for a liquid cooled engine including,
sensor means for mounting on said radiator at a predetermined level for distinguishing when said liquid is above or below said level,
circuit means for applying AC electrical potential to said sensor means and detecting current flow in said sensor means and
a means connected to said circuit means for providing a humanly discernible indication when said circuit means applies said AC electrical potential to said sensor means and current flow is not detected therein,
said sensor means comprises a pair of identical, parallelly extending and spaced electrically conducting probes of equal length exposed along their lengths for contact by said liquid, an electrical insulator partition extending between said probes so as to interrupt any direct conduction path therebetween and a pair of electrical terminals respectively connected to said pair of probes and disposed so as to be external to said radiator for connection to said circuit means.

5. In a conductive liquid level monitoring system as in claim 4, said sensor means further includes an insulative body for supporting said probes, said terminals and said partition and for providing a hermetic seal between said probes and said terminals.

6. In a conductive liquid level monitoring system as in claim 5, said partition is of such a size as to define a constant minimum electrical conductive path distance between said probes, whereby said minimum path distance is great enough to prevent electrical conduction between said probes when said probes are not submerged within said conductive liquid.

* * * * *